(12) United States Patent
Abe (10) Patent No.: US 9,310,662 B2
(45) Date of Patent: Apr. 12, 2016

(54) ELECTROPHORETIC DISPLAY APPARATUS AND ELECTRONIC DEVICE HAVING A BOUNDARY LAYER BETWEEN AN ELECTRODE AND AN ELECTROPHORETIC LAYER

(71) Applicant: SEIKO EPSON CORPORATION, Tokyo (JP)

(72) Inventor: Daisuke Abe, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 184 days.

(21) Appl. No.: 13/800,373

(22) Filed: Mar. 13, 2013

(65) Prior Publication Data
US 2013/0258448 A1  Oct. 3, 2013

(30) Foreign Application Priority Data
Apr. 2, 2012  (JP) ................. 2012-084076

(51) Int. Cl.
G02B 26/00 (2006.01)
G02F 1/167 (2006.01)
G09G 3/34 (2006.01)

(52) U.S. Cl.
CPC ........ *G02F 1/167* (2013.01); *G02F 2001/1672* (2013.01); *G02F 2001/1678* (2013.01); *G09G 3/344* (2013.01)

(58) Field of Classification Search
CPC ............ G02F 1/167; G02F 2001/1678; G02F 2001/1672; G09G 3/344
USPC ................... 359/290–298, 242, 247
See application file for complete search history.

(56) References Cited

U.S. PATENT DOCUMENTS

| | | | | |
|---|---|---|---|---|
| 7,852,547 B2 * | 12/2010 | Kim | .............................. | 359/296 |
| 8,237,653 B2 * | 8/2012 | Maeda et al. | ................. | 345/107 |
| 2002/0182544 A1 | 12/2002 | Chan-Park et al. | | |
| 2005/0007653 A1 | 1/2005 | Honeyman et al. | | |
| 2006/0023296 A1 * | 2/2006 | Whitesides et al. | .......... | 359/293 |
| 2007/0008439 A1 * | 1/2007 | Nakayama et al. | ............... | 349/2 |

FOREIGN PATENT DOCUMENTS

| | | |
|---|---|---|
| JP | A-2003-526817 | 9/2003 |
| JP | 2006-259771 A | 9/2006 |
| JP | 2006-521586 A | 9/2006 |
| JP | A-2007-271957 | 10/2007 |
| JP | A-2009-48010 | 3/2009 |
| JP | B2-4348180 | 10/2009 |
| JP | 2012-098640 A | 5/2012 |
| WO | WO 01/67170 A1 | 9/2001 |
| WO | WO 03/007066 A2 | 1/2003 |

* cited by examiner

*Primary Examiner* — Bumsuk Won
*Assistant Examiner* — Tamara Y Washington
(74) *Attorney, Agent, or Firm* — Oliff PLC (57) ABSTRACT

An electrophoretic display apparatus has an electrophoretic layer interposed between a first electrode and a second electrode each provided on the inner surface side of each of a pair of substrates and a boundary layer interposed between the first electrode and the electrophoretic layer. When the boundary layer has a thickness of $T_1$ and a volume resistivity of $\rho_1$ and the electrophoretic layer has a thickness of $T_0$ and a volume resistivity of $\rho_0$, the thickness and the volume resistivity of the boundary layer satisfy the formula $(\rho_1/T_1) \geq 1 \times 10^{13} \Omega$, and the thickness and the volume resistivity of the boundary layer and the electrophoretic layer satisfy the formula $(\rho_1 \cdot T_1)/(\rho_0 \cdot T_0) \leq 1/9$.

8 Claims, 5 Drawing Sheets

ELECTROPHORETIC DISPLAY APPARATUS AND ELECTRONIC DEVICE HAVING A BOUNDARY LAYER BETWEEN AN ELECTRODE AND AN ELECTROPHORETIC LAYER

BACKGROUND

1. Technical Field

The present invention relates to an electrophoretic display apparatus and an electronic device.

2. Related Art

A known type of electrophoretic display apparatus has an electrophoretic layer containing a dispersion medium and electrophoretic particles and interposed between two electrodes formed on the inner surface side of a pair of substrates. This type of electrophoretic display apparatus can be made to show desired information by controlling the characteristics of the voltage applied between the electrodes, such as amplitude, polarity, waveform, application time, and frequency.

Electrophoretic display apparatuses of this type should be prevented from leaking current between pixel electrodes (the individual sections of a first electrode) to have desired display properties. A known technique for this purpose is to provide an adhesive agent layer having a predetermined volume resistivity between the pair of substrates in addition to the electrophoretic layer (e.g., see Japanese Patent No. 4348180).

This technique, which limits only the volume resistivity of the adhesive agent interposed between the electrodes, may cause the voltage applied to the electrophoretic particles to be insufficient. When the adhesive agent is applied too thick, furthermore, the adhesive agent becomes another cause of voltage loss and can make the voltage applied to the electrophoretic layer too small. Electrophoretic display apparatuses produced by this technique may therefore have unsatisfactory display properties and lack the reliability required for their intended use.

SUMMARY

An advantage of some aspects of the invention is that they provide an electrophoretic display apparatus that offers desired display properties owing to reduced current leakage between pixel electrodes and sufficient voltage supply to the electrophoretic layer and an electronic device advantageous in the same way.

To solve the problems described above, the electrophoretic display apparatus according to an aspect of the invention has an electrophoretic layer interposed between a first electrode and a second electrode each provided on the inner surface side of each of a pair of substrates and a boundary layer positioned in a boundary between the first electrode and the electrophoretic layer. When the boundary layer has a thickness of $T_1$ cm and a volume resistivity of $\rho_1$ $\Omega \cdot$cm and the electrophoretic layer has a thickness of $T_0$ cm and a volume resistivity of $\rho_0$ $\Omega \cdot$cm, the thickness and the volume resistivity of the boundary layer satisfy the formula $(\rho_1/T_1) \geq 1 \times 10^{13} \Omega$, and the thickness and the volume resistivity of the boundary layer and the electrophoretic layer satisfy the formula $(\rho_1 \cdot T_1)/(\rho_0 \cdot T_0) \leq 1/9$.

The electrophoretic display apparatus according to this aspect of the invention is relatively free of current leakage between pixels. As described later herein, the leakage current between pixels of this apparatus is $2.5 \times 10^{-12}$ A or less when the length of each side of one pixel is 100 μm and the distance between the individual sections of the first electrode is 10 μm (i.e., the pitch is 110 μm) and 10 V of voltage is applied to some selected pixels, for example; the amount of leakage is as small as the off-state leakage current of an ordinary pixel transistor. Furthermore, at least 90% of the supply voltage is applied to the electrophoretic layer. This aspect of the invention therefore provides an electrophoretic display apparatus that offers desired display properties and high reliability owing to reduced current leakage between the individual sections of the first electrode and sufficient voltage supply to the electrophoretic layer.

This electrophoretic display apparatus may be configured so that the thickness and the volume resistivity of the electrophoretic layer should further satisfy the formula $(\rho_0 \cdot T_0) \geq 1 \times 10^9 \, \Omega \cdot$cm$^2$.

This configuration allows the boundary layer to have additional layers including, among others, an adhesive layer and a stress relaxation layer until the entire thickness is as large as 30 μm or more; the thickness of the boundary layer can be increased for adhesion and stress relaxation purposes. Furthermore, when the boundary layer is a residue of embossed walls, for example, this configuration expands the allowable range of the thickness of the residue and makes it easier to emboss the boundary layer. When the boundary layer is a sealing layer, this configuration gives a greater margin of increase in the thickness of the sealing layer or the wall residue.

The electrophoretic display apparatus according to another aspect of the invention has an electrophoretic layer interposed between a first electrode and a second electrode each provided on the inner surface side of each of a pair of substrates and a boundary layer positioned in a boundary between the first electrode and the electrophoretic layer. When the boundary layer has a thickness of $T_1$ cm and a volume resistivity of $\rho_1$ $\Omega \cdot$cm and the electrophoretic layer has a thickness of $T_0$ cm and a volume resistivity of $\rho_0$ $\Omega \cdot$cm, the thickness and the volume resistivity of the boundary layer satisfy the formula $(\rho_1/T_1) \geq 5 \times 10^{12} \Omega$, and the thickness and the volume resistivity of the boundary layer and the electrophoretic layer satisfy the formula $(\rho_1 \cdot T_1)/(\rho_0 \cdot T_0) \leq 2/3$.

The electrophoretic display apparatus according to this aspect of the invention is relatively free of current leakage between pixels. As described later herein, the leakage current between pixels of this apparatus is $5.0 \times 10^-$ A or less when the length of each side of one pixel is 100 μm and the pixel pitch is 110 μm and 10 V of voltage is applied to some selected pixels, for example; the amount of leakage is as small as the off-state leakage current of an ordinary pixel transistor. Furthermore, at least 60% of the supply voltage is applied to the electrophoretic layer. This aspect of the invention therefore provides an electrophoretic display apparatus that offers desired display properties and high reliability owing to reduced current leakage between the individual sections of the first electrode and sufficient voltage supply to the electrophoretic layer.

This electrophoretic display apparatus may be configured so that the thickness and the volume resistivity of the electrophoretic layer should further satisfy the formula $(\rho_0 \cdot T_0) \geq 1 \times 10^8 \, \Omega \cdot$cm$^2$.

This configuration allows the boundary layer to have additional layers including, among others, an adhesive layer and a stress relaxation layer until the entire thickness is as large as 30 μm or more; the thickness of the boundary layer can be increased for adhesion and stress relaxation purposes. Furthermore, when the boundary layer is a sealing layer or is a residue of embossed walls, for example, this configuration gives a greater margin of increase in the thickness of the sealing layer or the wall residue.

The electrophoretic display apparatuses according to the above aspects of the invention may also be configured so that the boundary layer is a residue of an embossed wall member that partitions a pixel region as a place where the electrophoretic layer is positioned.

An electrophoretic display apparatus configured in this way offers desired display properties owing to reduced current leakage and sufficient voltage supply to the electrophoretic layer despite the presence of the residue of the wall member.

The electronic device according to yet another aspect of the invention has any of the electrophoretic display apparatuses described above.

The electronic device according this aspect of the invention is of high quality and offers desired display properties and excellent reliability owing to the electrophoretic display apparatus incorporated therein, which offers reduced current leakage between the individual sections of the first electrode and sufficient voltage supply to the electrophoretic layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes some embodiments of the invention with reference to the accompanying drawings. Different components in each drawing may be on different scales so that they should all look large enough to be recognized on the drawing.

Electrophoretic Display Apparatus

Figure 1:
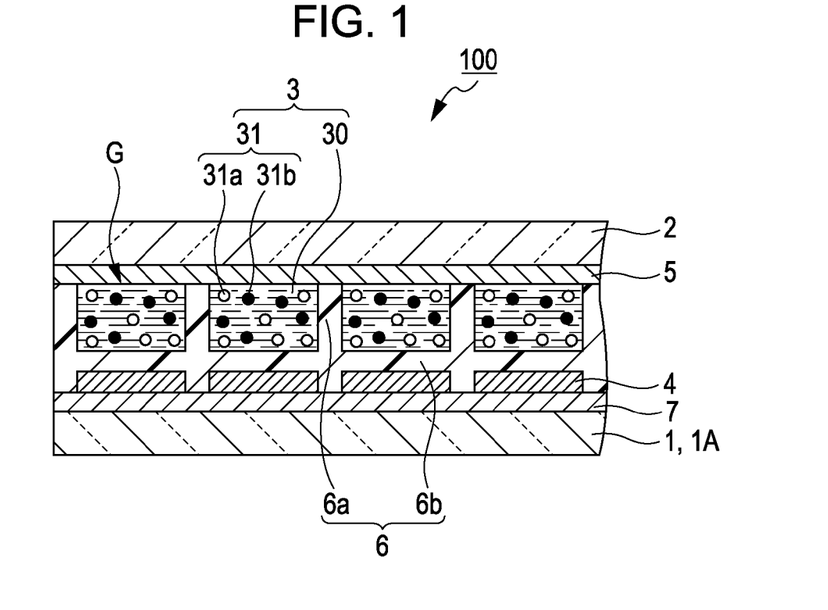
FIG. 1 schematically illustrates a cross-sectional view of an electrophoretic display apparatus according to an embodiment.

FIG. 1 schematically illustrates a cross-sectional view of an electrophoretic display apparatus according to this embodiment. As illustrated in FIG. 1, the electrophoretic display apparatus 100 has an element substrate 1, an opposite substrate 2, and an electrophoretic layer 3 interposed between the element substrate 1 and the opposite substrate 2. The electrophoretic layer 3 is positioned between a set of pixel electrodes (a first electrode) 4 formed on the inner surface side of the element substrate 1 and a common electrode (a second electrode) 5 formed on the inner surface side of the opposite substrate 2.

On the electrophoretic layer 3 side of the element substrate 1 a set of pixel electrodes 4 are arranged. These pixel electrodes 4 are formed on an insulating film 7 formed on a base 1A.

The base 1A is a substrate made of glass, plastic material, or any other suitable material. This substrate is located on the side opposite to the side on which the image is displayed (hereinafter referred to as the image display side) and thus is not necessarily transparent. The pixel electrodes 4 are formed from a Cu film plated with nickel and gold in this order or from an Al or ITO (indium tin oxide) film. Although not illustrated in the drawing, there are also scanning and data transmission lines, switching transistors, and other necessary elements between the pixel electrodes 4 and the element substrate 1.

The opposite substrate 2 is also a substrate made of glass, plastic material, or any other suitable material, but this substrate should be transparent because it is located on the image display side. On the electrophoretic layer 3 side of this opposite substrate 2 the common electrode 5 is formed in a flat shape to face the pixel electrodes 4, and on this common electrode 5 the electrophoretic layer 3 is formed. The common electrode 5 is a transparent electrode made of MgAg, ITO, IZO (indium zinc oxide), or any other suitable material.

On the element substrate 1, a wall member 6 is formed to cover the pixel electrodes 4. The wall member 6 separates pixels G corresponding to the pixel electrodes 4 on a one-by-one basis. The wall member 6 includes walls 6a that separate the pixels G from one another and a bottom 6b that extends between and connects these walls 6a.

Examples of materials used to make the wall member 6 include acrylic resin and epoxy resin. The wall member 6 is formed by covering the pixel electrodes 4 with a layer of any such resin and embossing a predetermined pattern on this resin layer.

During the embossing operation a male mold having projections and depressions corresponding in size to the pixels G is pressed against the resin layer to form the walls 6a and bottom 6b of the wall member 6 (the boundary layer). The bottom (boundary layer) 6b is therefore formed from the embossed-resin residue. The term embossed-resin residue, as used herein, represents some amount of resin left between the male mold and the element substrate 1 after the mold is pressed against the resin layer.

The electrophoretic layer 3 contains a dispersion medium 30 and electrophoretic particles 31 dispersed in it. In a typical configuration, some of the electrophoretic particles 31 are white particles 31a and the others are black particles 31b.

Examples of the dispersion medium 30 include water, alcohols and related solvents (e.g., methanol, ethanol, isopropanol, butanol, octanol, and methyl cellosolve), esters (e.g., ethyl acetate and butyl acetate), ketones (e.g., acetone, methyl ethyl ketone, and methyl isobutyl ketone), aliphatic hydrocarbons (e.g., pentane, hexane, and octane), alicyclic hydrocarbons (e.g., cyclohexane and methylcyclohexane), aromatic hydrocarbons (e.g., benzene, toluene, and long-chain-alkyl-substituted benzene derivatives such as xylene, hexylbenzene, heptylbenzene, octylbenzene, nonylbenzene, decylbenzene, undecylbenzene, dodecylbenzene, tridecylbenzene, and tetradecylbenzene), halogenated hydrocarbons (e.g., methylene chloride, chloroform, carbon tetrachloride, and 1,2-dichloroethane), and carboxylic acid salts as well as other oils. One or a mixture of such substances can be used with or without additional ingredients such as a surfactant.

In a typical configuration, negatively charged (polymer or colloidal) white particles 31*a* of a white pigment such as titanium dioxide, zinc white, or antimony trioxide and positively charged (polymer or colloidal) black particles 31*b* of a black pigment such as aniline black or carbon black are used. The pigments may contain particulate charge-controlling agents based on such materials as electrolytes, surfactants, metal soaps, resins, rubbers, oils, varnish, and compound materials, dispersants such as titanium coupling agents, aluminum coupling agents, and silane coupling agents, lubricants, stabilizing agents, and other additives as necessary.

It is also allowed to use red, green, and blue pigments or a different set of pigments instead of white particles 31*a* and black particles 31*b*. This configuration provides an electrophoretic display apparatus 100 that displays color images by showing red, green, and blue dots or dots in a different set of colors.

When the electrophoretic display apparatus 100 shows a white dot in a pixel G, it holds the common electrode 5 at a relatively high potential and the corresponding pixel electrode 4 at a relatively low potential. The negatively charged white particles 31*a* are attracted to the common electrode 5, while the positively charged black particles 31*b* are attracted to the corresponding pixel electrode 4. A person who sees this pixel G from the opposite substrate 2 side, i.e., the image display side, thus perceives a white color; the electrophoretic display apparatus 100 shows a white dot.

When the electrophoretic display apparatus 100 shows a black dot in a pixel G, it holds the common electrode 5 at a relatively low potential and the pixel electrode 4 at a relatively high potential. The positively charged black particles 31*b* are attracted to the common electrode 5, while the negatively charged white particles 31*a* are attracted to the pixel electrode 4. A person who sees this pixel G from the opposite substrate 2 side, i.e., the image display side, thus perceives a black color; the electrophoretic display apparatus 100 shows a black dot.

Configured in such a way, the electrophoretic display apparatus 100 as a whole can show desired images by applying an appropriate amount of voltage between the pixel electrode 4 for each pixel G and the common electrode 5 and making the electrophoretic particles 31 (white particles 31*a* and black particles 31*b*) in the electrophoretic layer 3 move to the opposite substrate 2 side to switch each pixel G between black and white.

The electrophoretic display apparatus 100 according to this embodiment has an additional layer different from the electrophoretic layer 3 between the pixel electrodes 4 and the electrophoretic layer 3, i.e., the bottom 6*b* of the wall member 6 (boundary layer). The presence of this bottom 6*b* may cause the voltage applied to the electrophoretic layer 3 to be insufficient and lead to poor movement of the electrophoretic particles 31 in the electrophoretic layer 3. If this occurs, it may be impossible to achieve desired display properties.

This can be avoided by reducing the resistance of the bottom 6*b* in the vertical direction, and a possible way to do this is to reduce the resistivity of the bottom 6*b*. If the resistivity of the bottom 6*b* is too small, however, applying different amounts of voltage to pixel electrodes 4 for adjacent pixels G causes current leakage between these pixel electrodes, thereby leading to an increased power consumption. In the worst case, it may become impossible to achieve desired display properties since the adjacent pixel electrodes 4 become equipotential and unable to keep showing dots when the voltage is turned off. In this way, reducing the resistivity of the bottom 6*b* is effective to ensure sufficient voltage supply to the electrophoretic layer 3, but unfortunately causes an increased leakage current and affects the display properties of the entire apparatus as described above.

Another possible way to reduce the resistance of the bottom 6*b* in the vertical direction is to make its thickness smaller. In an actual manufacturing process, however, reducing the thickness of the bottom 6*b* to a sufficiently small level by embossing is difficult and can lead to a narrower process window.

After extensive research, the inventors found that by selecting the thickness and volume resistivity of the electrophoretic layer 3 and those of a layer different from the electrophoretic layer 3 and existing between the pixel electrodes 4 and the common electrode 5 (the bottom 6*b* in this embodiment) to satisfy the conditions specified below, current leakage can be prevented while satisfactory display properties are achieved.

Figure 2:
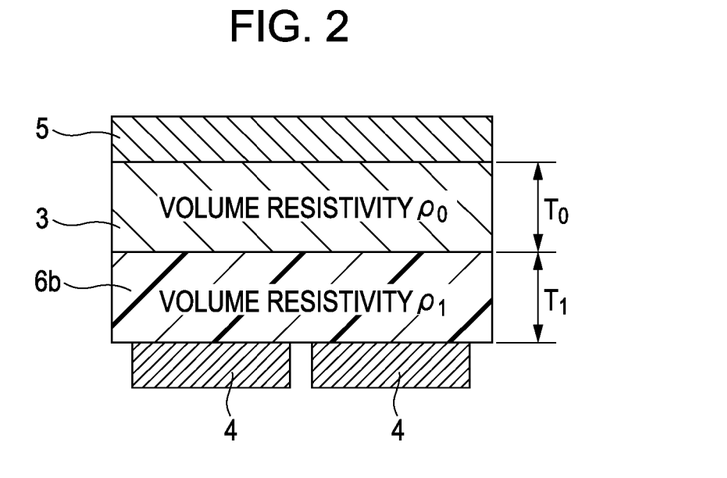
FIG. 2 is a cross-sectional view of some major peripheral components for some pixels.

FIG. 2 is a cross-sectional view of some major peripheral components for some pixels G. FIG. 2 omits walls 6*a* for the sake of simplicity.

As illustrated in FIG. 2, the bottom 6*b* of the wall member 6 and the electrophoretic layer 3 are stacked in this order between the pixel electrodes 4 and the common electrode 5. The bottom 6*b* has a thickness of $T_1$ and a volume resistivity of $\rho_1$, and the electrophoretic layer 3 has a thickness of $T_0$ and a volume resistivity of $\rho_0$.

Figure 3:
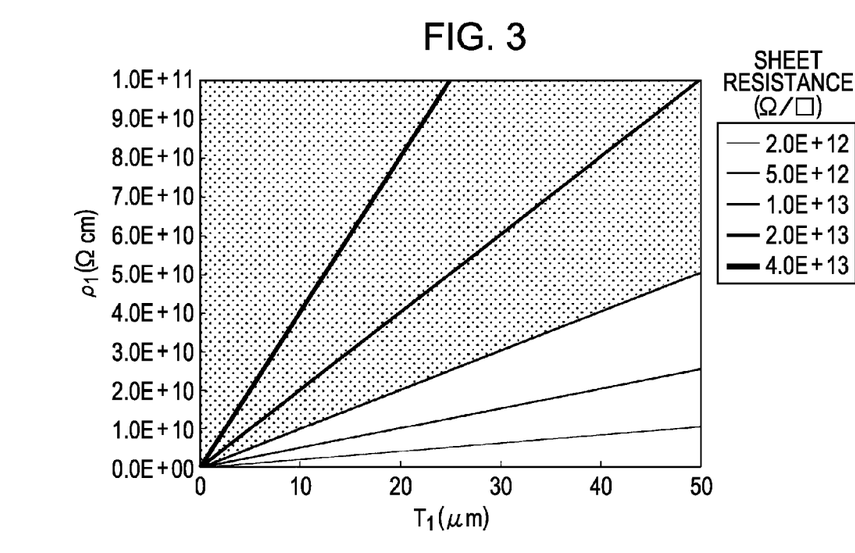
FIG. 3 is a graph showing the relation between the volume resistivity and thickness of the bottom for different sheet resistance values.

FIG. 3 is a graph showing the relation between the volume resistivity $\rho_1$ and thickness $T_1$ of the bottom 6*b* for different sheet resistance values. The inventors found that the leakage current between adjacent pixel electrodes 4 can be as small as the off-state leakage current of an ordinary pixel transistor when the sheet resistance of the bottom 6*b* is $1 \times 10^{13} \Omega/\square$ or more.

To make the sheet resistance of the bottom 6*b* equal to or more than $1 \times 10^{13} \Omega/\square$, it is required that the thickness $T_1$ and resistivity $\rho_1$ of the bottom 6*b* be selected within the hatched portion in FIG. 3. Therefore the bottom 6*b* should be formed so that its thickness $T_1$ and resistivity $\rho_1$ should satisfy the formula $(\rho_1/T_1) \geq 1 \times 10^{13} \Omega$.

A test of an electrophoretic display apparatus 100 in which the bottom 6*b* satisfied these conditions revealed that the leakage current between pixels of this apparatus was not more than $2.5 \times 10^{-12}$ A and thus was as small as the off-state leakage current of an ordinary pixel transistor when the length of each side of one pixel G was 100 μm and the pixel pitch was 10 μm and 10 V of voltage was applied to some selected pixels, for example. The off-state leakage current of a pixel transistor is usually on the order of $10^{-11}$ to $10^{-12}$ A, depending on the manufacturing method and size of the transistor and other factors.

Based on these findings, the inventors determined that the formula $(\rho_1/T_1) \geq 1 \times 10^{13} \Omega$ (formula (1)) is right for the conditions limiting the thickness $T_1$ and volume resistivity $\rho_1$ of the bottom 6*b* of the electrophoretic display apparatus 100 according to this embodiment.

Another requirement is to apply a sufficient amount of voltage to the electrophoretic layer 3 in the direction of its thickness (the vertical direction), and what is important for this purpose is the relation between the bottom 6*b* and the electrophoretic layer 3 in terms of their resistance in the thickness direction. When the ratio of the voltage applied to the electrophoretic layer 3 to the voltage applied between the pixel electrodes 4 and the common electrode 5 is denoted as A ($0 \leq A \leq 1$), the following equation holds: $(\rho_1 \cdot T_1)/(\rho_0 \cdot T_0) = (1-A)/A$.

Figure 4:
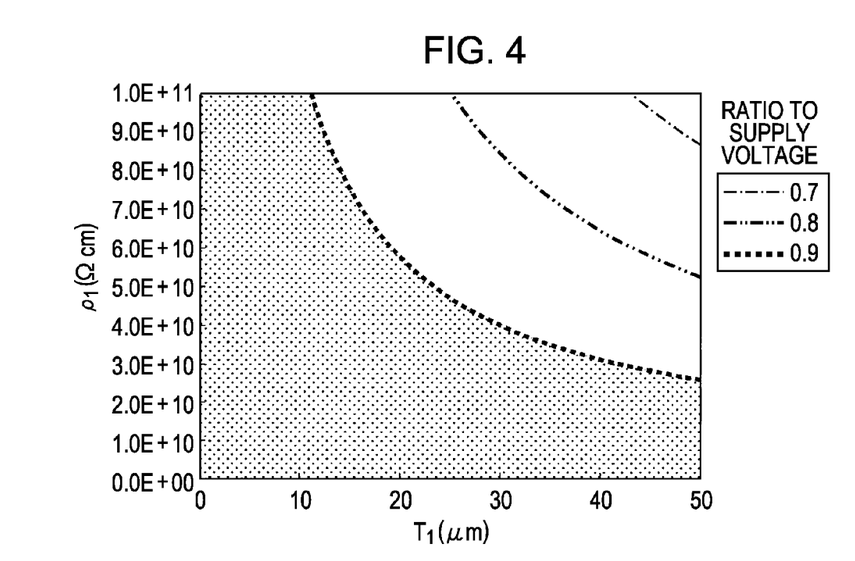
FIG. 4 is a graph showing the relation between the volume resistivity and thickness of the bottom for different proportions of voltage applied to the electrophoretic layer.

FIG. 4 shows the relation between the volume resistivity $\rho_1$ and thickness $T_1$ of the bottom 6b, for different A values, determined on the assumption that the resistance per unit area $\rho_0 \cdot T_0$ of the electrophoretic layer 3 is $1 \times 10^9$ $\Omega \cdot cm^2$, for example. The electrophoretic layer 3 can be driven at a low supply voltage when the voltage transmission is efficient enough that 90% or more of the driving voltage can be applied to the electrophoretic layer 3.

To achieve this, it is required that the thickness and volume resistivity of the bottom 6b and the electrophoretic layer 3 be selected within the hatched portion in FIG. 4, or satisfy the formula $(\rho_1 \cdot T_1)/(\rho_0 \cdot T_0) \leq 1/9$ (formula (2)).

A test of an electrophoretic display apparatus 100 in which the bottom 6b and the electrophoretic layer 3 satisfied these conditions revealed that not less than 90% of the driving voltage was applied to the electrophoretic layer 3 as described above and, as a result, the electrophoretic layer 3 could be driven at a low supply voltage.

Based on these findings, the inventors determined that the formula $(\rho_1 \cdot T_1)/(\rho_0 \cdot T_0) \leq 1/9$ is right for the conditions limiting the thickness and volume resistivity of the bottom 6b and the electrophoretic layer 3 of the electrophoretic display apparatus 100 according to this embodiment.

Figure 5:
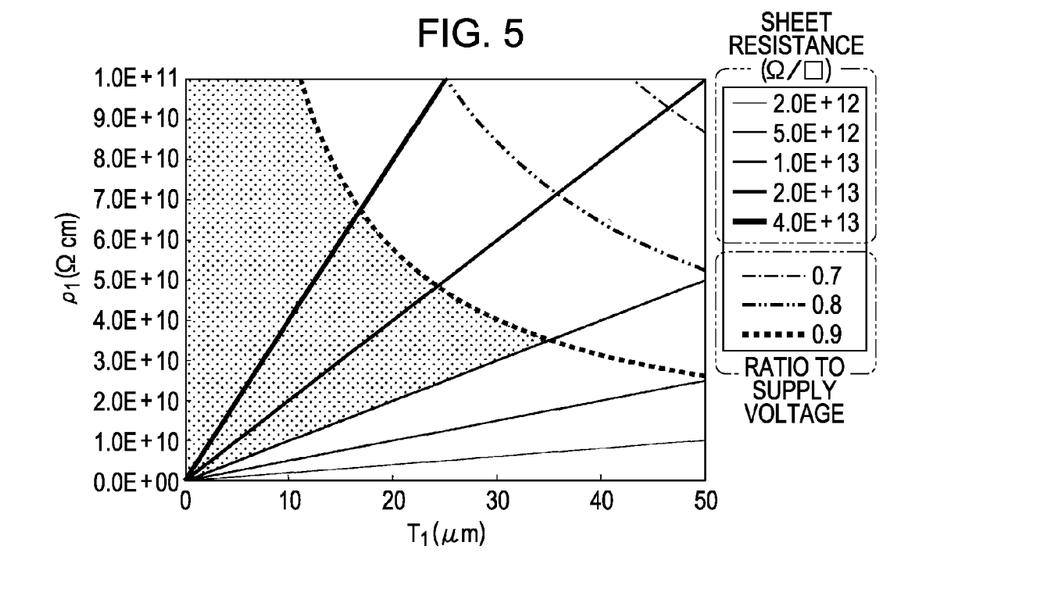
FIG. 5 is a graph showing the area where the hatched portions in FIGS. 3 and 4 overlap.

This means that the bottom 6b in the electrophoretic display apparatus 100 according to this embodiment should have a resistivity and a thickness selected within the area where the hatched portions in FIGS. 3 and 4 overlap. FIG. 5 shows the area where the hatched portions in FIGS. 3 and 4 overlap, i.e., the conditions the bottom 6b should satisfy in this embodiment.

FIG. 5 indicates that the thickness $T_1$ of the bottom 6b can be increased up to approximately 33 μm when the volume resistivity $\rho_1$ is $3.3 \times 10^{10}$ $\Omega \cdot cm$ or more. This extended allowable range of the thickness of the bottom 6b makes it easier to emboss the wall member 6.

In summary, the electrophoretic display apparatus 100 according to this embodiment is relatively free of current leakage between pixels G because the bottom 6b and the electrophoretic layer 3 satisfy the conditions specified by formulae (1) and (2); the amount of leakage is $2.5 \times 10^{-12}$ A or less and thus is as small as the off-state leakage current of an ordinary pixel transistor. Furthermore, at least 90% of the supply voltage is applied to the electrophoretic layer 3. This apparatus therefore offers desired display properties and high reliability owing to reduced current leakage between pixel electrodes 4 and sufficient voltage supply to the electrophoretic layer 3.

In the case where it is possible to loosen the performance requirements of the electrophoretic display apparatus 100 in terms of the amount of leakage current and the proportion of voltage applied to the electrophoretic layer 3 to be $5 \times 10^{-12}$ A and at least 60% of the supply voltage, respectively, the bottom 6b is formed to satisfy the formula $(\rho_1/T_1) \geq 5 \times 10^{12} \Omega$ (formula (3)) instead of formula (1).

Likewise, the thickness and the volume resistivity of the bottom 6b and the electrophoretic layer 3 are selected to satisfy the formula $(\rho_1 \cdot T_1)/(\rho_0 \cdot T_0) \leq 2/3$ (formula (4)) instead of formula (2).

Figure 6:
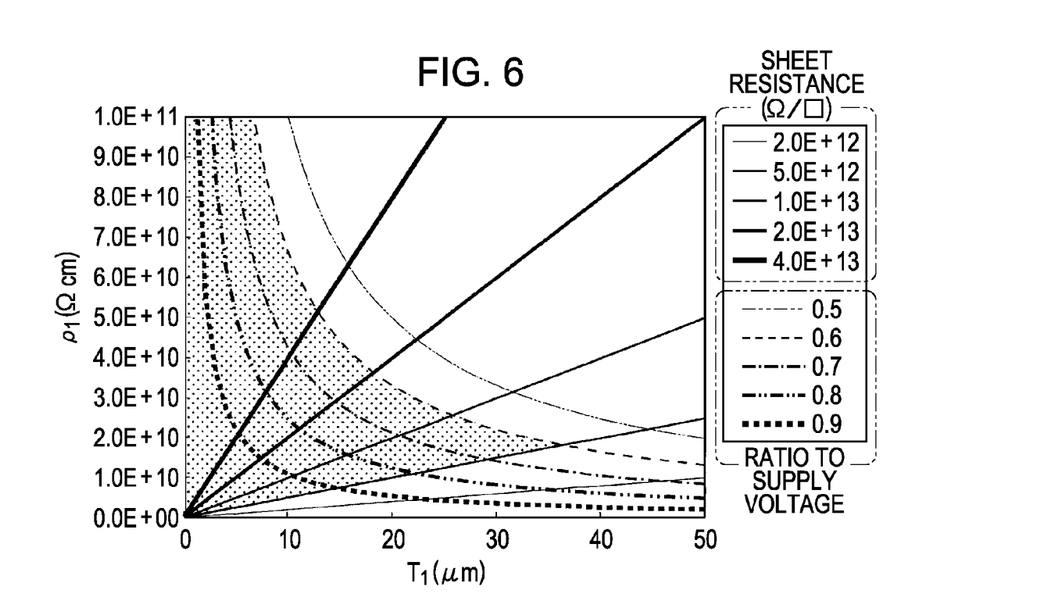
FIG. 6 is a graph showing the range of volume resistivity and thickness of the bottom for loosened performance requirements in terms of the amount of leakage current and the proportion of voltage applied to the electrophoretic layer.

Assuming that the resistance per unit area $\rho_0 \cdot T_0$ of the electrophoretic layer 3 is $1 \times 10^8$ $\Omega \cdot cm^2$, for example, the conditions under which both formulae (3) and (4) hold are indicated by the hatched portion in FIG. 6.

A test of an electrophoretic display apparatus 100 in which the bottom 6b and the electrophoretic layer 3 satisfied these conditions revealed that the leakage current between pixels of this apparatus was not more than $5.0 \times 10^{-12}$ A and thus was as small as the off-state leakage current of an ordinary pixel transistor when the length of each side of one pixel G was 100 μm and the pixel pitch was 10 μm and 10 V of voltage was applied to some selected pixels, for example.

Although in the region indicated in FIG. 6 the voltage applied to the electrophoretic layer 3 is generally lower than in the region indicated in FIG. 5, this can be made quite acceptable by using high-mobility electrophoretic particles 31 in the electrophoretic layer 3. As described above, the amount of leakage current is also more than acceptable.

FIG. 6 also indicates that the thickness $T_1$ of the bottom 6b can be increased up to approximately 36 μm. This further extended allowable range of the thickness of the bottom 6b makes it even easier to emboss the wall member 6.

Figure 7:
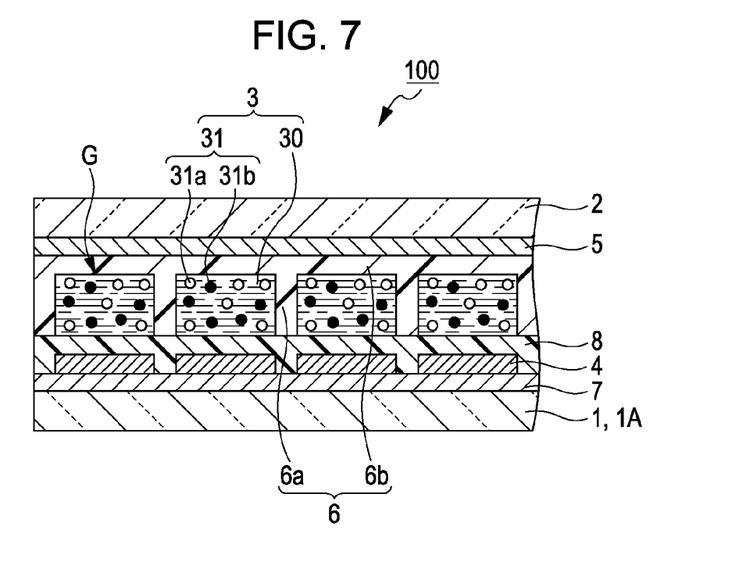
FIG. 7 schematically illustrates a cross-sectional view of an electrophoretic display apparatus in which the boundary layer is a sealing layer.
Figure 8:
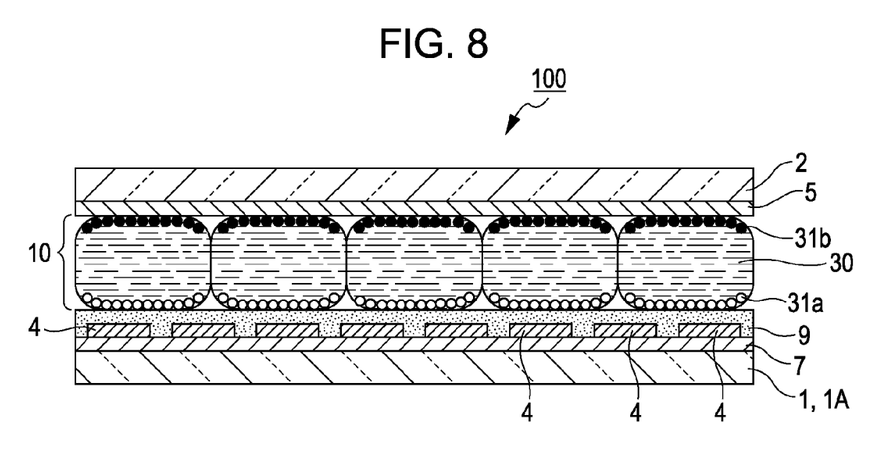
FIG. 8 schematically illustrates a cross-sectional view of an electrophoretic display apparatus in which the boundary layer is an adhesive layer.

Incidentally, the above description about an embodiment of the invention should not be construed as limiting any aspect of the invention. If necessary, various modifications can be made without departing from the gist of the invention. For example, although in the above embodiment the boundary layer is a residue (the bottom 6b) of an embossed wall member 6, this is not the only configuration of the boundary layer possible in the invention. The boundary layer can be in any configuration, and a typical minimum configuration is that the boundary layer should exist between the pixel electrodes 4 and the common electrode 5 and be different from the electrophoretic layer 3. FIGS. 7 and 8 illustrate the configuration of some modified boundary layers.

The configuration illustrated in FIG. 7 contains a sealing layer 8 between the pixel electrodes 4 and the electrophoretic layer 3 as the boundary layer used in the invention. The sealing layer 8 seals the electrophoretic layer 3 within pixels G separated by the wall member 6 formed on this sealing layer 8. As with the wall member 6, examples of materials used to make the sealing layer 8 include epoxy resin and similar materials. In this modification, as illustrated in FIG. 7, the walls 6a of the wall member 6 stand on the sealing layer 8, and the bottom 6b is formed on the common electrode 5 side. This means that in this modification the material of the wall member 6 is applied to the common electrode 5, which is on the opposite substrate 2 side, and the wall member 6 is embossed on the resulting layer.

On the other hand, the configuration illustrated in FIG. 8 contains an adhesive layer 9 between the pixel electrodes 4 and the electrophoretic layer 3 as the boundary layer used in the invention. The electrophoretic layer 3 in this configuration is composed of microcapsules 10. More specifically, this is an embodiment in which an adhesive layer 9 bonds more than one microcapsule 10 and the pixel electrodes 4 together.

In a typical configuration, the microcapsules 10 are spheres having a diameter of about 50 μm with a dispersion medium 30, white particles 31a, and black particles 31b inside. One or more microcapsules 10 are positioned within each pixel G.

In this way, the boundary layer is not limited to the bottom 6b of a wall member 6 described above and conceptually includes the above-mentioned sealing layer 8 and adhesive layer 9 as well as a stress relaxation layer and other kinds of layers interposed between the pixel electrodes 4 and the electrophoretic layer 3.

Therefore, any configuration in which the boundary layer is formed to satisfy the conditions formulae (1) and (2) or formulae (3) and (4) in relation to the electrophoretic layer 3 provides an electrophoretic display apparatus 100 that offers desired display properties and high reliability owing to reduced current leakage between pixel electrodes 4 and sufficient voltage supply to the electrophoretic layer 3, as with the above embodiments. Electronic device The following describes the application of electrophoretic display apparatuses according to the above embodiments to electronic devices.

Figure 9A:
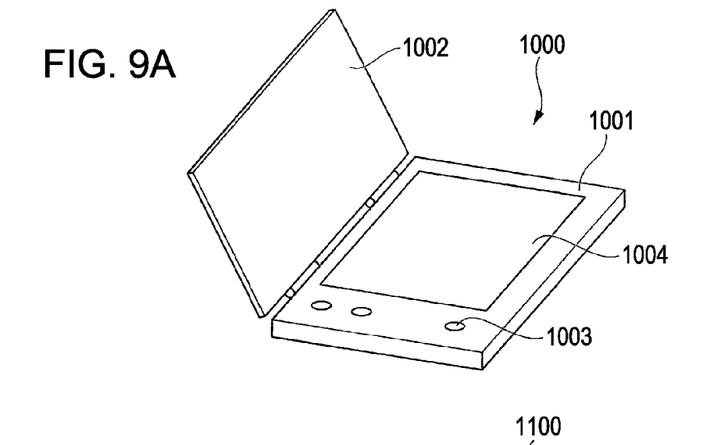
FIGS. 9A to 9C are perspective views of some specific examples of electronic devices that incorporate an electrophoretic display apparatus according to an aspect of the invention.
Figure 9B:
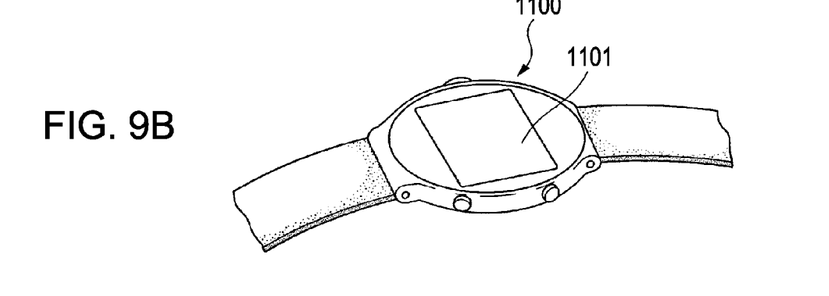
Figure 9C:
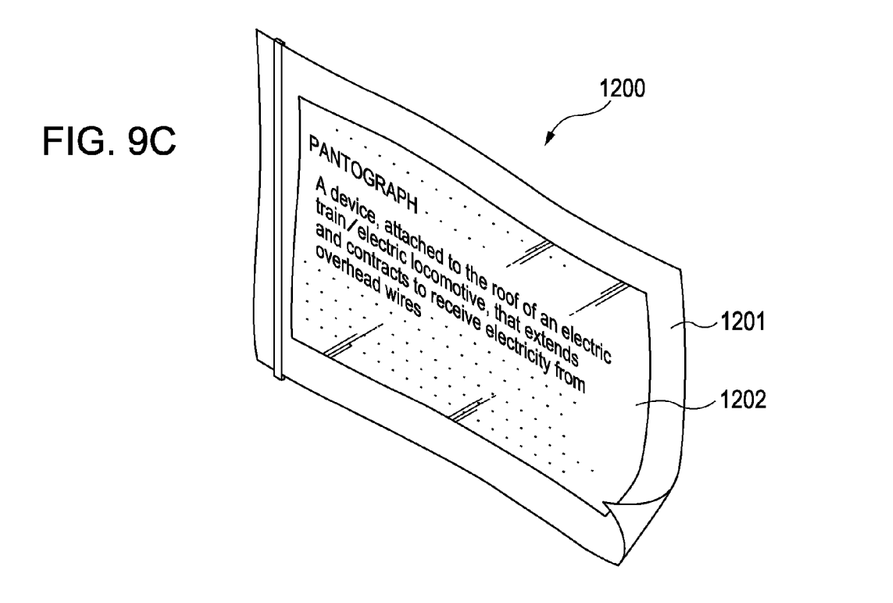

FIGS. 9A to 9C are perspective views of some specific examples of electronic devices that incorporate an electrophoretic display apparatus according to an aspect of the invention.

FIG. 9A is a perspective view of an e-book reader as an example of such electronic devices. This e-book reader (electronic device) 1000 has a book-shaped frame 1001, a cover 1002 fit to this frame 1001 and rotatable around the joint (a flip cover), a controller 1003, and a screen 1004 made using an electrophoretic display apparatus according to an aspect of the invention.

FIG. 9B is a perspective view of a wristwatch as another example of such electronic devices. This wristwatch (electronic device) 1100 has a screen 1101 made using an electrophoretic display apparatus according to an aspect of the invention.

FIG. 9C is a perspective view of an electronic paper display as yet another example of such electronic devices. This electronic paper display (electronic device) 1200 has a main unit 1201 that is a rewritable sheet having paper-like texture and flexibility and a screen 1202 made using an electrophoretic display apparatus according to an aspect of the invention.

Among others, such devices as e-book readers and electronic paper are expected to be used in applications where characters are repeatedly written on a white background. Thus these types of devices should not leave any ghost images upon deletion of characters or after a long period of operation.

The range of electronic devices to which electrophoretic display apparatuses according to aspects of the invention can be applied is not limited to the foregoing and includes a wide variety of equipment that utilize visual color changes associated with movement of charged particles.

The e-book reader 1000, wristwatch 1100, and electronic paper display 1200 described above are high-quality electronic devices offering desired display properties and excellent reliability owing to the electrophoretic display apparatus according to an aspect of the invention incorporated therein, which offers reduced current leakage between the individual sections of the first electrode and sufficient voltage supply to the electrophoretic layer.

The above-listed electronic devices are only to illustrate the electronic device according to an aspect of the invention and should not be construed as limiting the technical scope of that aspect of the invention. For example, electrophoretic display apparatuses according to aspects of the invention are also suitable for use in screens of electronic devices such as mobile phones and portable media players as well as manuals and other operational instruction sheets, textbooks and workbooks, information sheets, and so forth.

The entire disclosure of Japanese Patent Application No. 2012-084076, filed Apr. 2, 2012 is expressly incorporated by reference herein.

What is claimed is:

1. An electrophoretic display apparatus comprising:
an electrophoretic layer interposed between a first electrode and a second electrode each provided on the inner surface side of each of a pair of substrates; and
a boundary layer positioned in a boundary between the first electrode and the electrophoretic layer, wherein:
when the boundary layer has a thickness of $T_1$ cm and a volume resistivity of $\rho_1$ $\Omega \cdot$cm and
the electrophoretic layer has a thickness of $T_0$ cm and a volume resistivity of $\rho_0$ $\Omega \cdot$cm,
the thickness and the volume resistivity of the boundary layer satisfy the following formula:

$$(\rho_1/T_1) \geq 1 \times 10^{13} \Omega;$$

the thickness and the volume resistivity of the boundary layer and the electrophoretic layer satisfy the following formula:

$$(\rho_1 \cdot T_1)/(\rho_0 \cdot T_0) \leq 1/9; \text{ and}$$

the thickness and the volume resistivity of the electrophoretic layer satisfy the following formula:

$$(\rho_0 \cdot T_0) \geq 1 \times 10^9 \, \Omega \cdot cm^2.$$

2. An electrophoretic display apparatus comprising:
an electrophoretic layer interposed between a first electrode and a second electrode each provided on the inner surface side of each of a pair of substrates; and
a boundary layer positioned in a boundary between the first electrode and the electrophoretic layer, wherein:
when the boundary layer has a thickness of $T_1$ cm and a volume resistivity of $\rho_1$ $\Omega \cdot$cm and
the electrophoretic layer has a thickness of $T_0$ cm and a volume resistivity of $\rho_0$ $\Omega \cdot$cm,
the thickness and the volume resistivity of the boundary layer satisfy the following formula:

$$(\rho_1/T_1) \geq 5 \times 10^{12} \Omega;$$

the thickness and the volume resistivity of the boundary layer and the electrophoretic layer satisfy the following formula:

$$(\rho_1 \cdot T_1)/(\rho_0 \cdot T_0) \leq 2/3; \text{ and}$$

the thickness and the volume resistivity of the electrophoretic layer satisfy the following formula:

$$(\rho_0 \cdot T_0) \geq 1 \times 10^8 \Omega \cdot cm^2.$$

3. The electrophoretic display apparatus according to claim 1, wherein the boundary layer is a residue of an embossed wall member that partitions a pixel region as a place where the electrophoretic layer is positioned.

4. An electronic device comprising the electrophoretic display apparatus according to claim 1.

5. An electronic device comprising the electrophoretic display apparatus according to claim 2.

6. An electronic device comprising the electrophoretic display apparatus according to claim 3.

7. The electrophoretic display apparatus according to claim 2, wherein the boundary layer is a residue of an embossed wall member that partitions a pixel region as a place where the electrophoretic layer is positioned.

8. An electronic device comprising the electrophoretic display apparatus according to claim 7.

* * * * *